(12) United States Patent
Lorenschat et al.

(10) Patent No.: US 10,498,051 B2
(45) Date of Patent: Dec. 3, 2019

(54) CONDUCTOR TERMINAL AND METHOD FOR MOUNTING THE SAME

(71) Applicant: WAGO Verwaltungsgesellschaft, Minden (DE)

(72) Inventors: Markus Lorenschat, Porta Westfallica (DE); Rudolf Mastel, Porta Westfallica (DE); Maria Glammeier, Porta Westfallica (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/211,943

(22) Filed: Dec. 6, 2018

(65) Prior Publication Data

US 2019/0109390 A1 Apr. 11, 2019

Related U.S. Application Data

(63) Continuation of application No. 15/510,849, filed as application No. PCT/EP2015/073121 on Sep. 25, 2015, now Pat. No. 10,193,245.

(30) Foreign Application Priority Data

Sep. 26, 2014 (DE) .......................... 10 2014 114 026

(51) Int. Cl.
*H01R 4/48* (2006.01)
*H01R 43/18* (2006.01)
*H01R 43/20* (2006.01)

(52) U.S. Cl.
CPC ......... *H01R 4/4836* (2013.01); *H01R 4/4845* (2013.01); *H01R 43/18* (2013.01); *H01R 43/20* (2013.01)

(58) Field of Classification Search
CPC .... H01R 4/4836; H01R 4/4845; H01R 43/18; H01R 43/20
(Continued)

(56) References Cited

U.S. PATENT DOCUMENTS 6,341,989 B1 1/2002 Jaag
6,689,955 B2 2/2004 Doutaz
(Continued)

FOREIGN PATENT DOCUMENTS

DE          84 24 056 U1   11/1984
DE    20 2009 001 488 U1    7/2010
(Continued)

*Primary Examiner* — Edwin A. Leon
*Assistant Examiner* — Oscar C Jimenez
(74) *Attorney, Agent, or Firm* — Muncy, Geissler, Olds & Lowe, P.C.

(57) ABSTRACT

A conductor terminal having at least one insulating material housing; at least one contact insert arranged at least partially in the housing and having at least one contact piece and at least one clamping spring. The contact piece, together with the clamping spring, forms at least one conductor clamping point for an electrical conductor to be contacted via the conductor terminal, which electrical conductor can be acted upon by a spring force of the clamping spring. At least one actuating lever is pivotably supported in the housing for actuating the clamping spring. The actuating lever can be pivoted from a closed position to an open position and vice versa in relation to the housing and/or the contact piece and an electrical conductor inserted into the conductor terminal is not acted upon by the spring force of the clamping spring at the conductor clamping point at least in the open position.

18 Claims, 15 Drawing Sheets

(58) Field of Classification Search
USPC .......................................... 439/268, 441, 729
See application file for complete search history.

(56) References Cited

U.S. PATENT DOCUMENTS

| | | |
|---|---|---|
| 8,388,387 B2 | 3/2013 | Koellmann |
| 8,500,498 B2 | 8/2013 | Abundis et al. |
| 9,124,034 B2 | 9/2015 | Köllmann et al. |
| 9,413,082 B2 | 8/2016 | Gassauer |
| 9,466,894 B2 | 10/2016 | Wu et al. |
| 9,466,895 B2 | 10/2016 | Köllmann et al. |
| 2016/0190713 A1* | 6/2016 | Wu ...................... H01R 4/4836 439/733.1 |
| 2016/0204526 A1* | 7/2016 | Wu ...................... H01R 4/4809 439/816 |
| 2018/0006385 A1* | 1/2018 | Wilinski .............. H01R 4/4836 |
| 2018/0076536 A1 | 3/2018 | Hartmann |

FOREIGN PATENT DOCUMENTS

| | | |
|---|---|---|
| DE | 10 2010 024 809 A1 | 12/2011 |
| DE | 10 2011 110 640 A1 | 2/2013 |
| DE | 10 2011 056 410 A1 | 6/2013 |
| DE | 10 2012 110 759 A1 | 5/2014 |
| DE | 10 2012 110 895 A1 | 5/2014 |
| DE | 10 2013 101 409 A1 | 8/2014 |
| EP | 0 253 239 B1 | 12/1992 |

\* cited by examiner

CONDUCTOR TERMINAL AND METHOD FOR MOUNTING THE SAME

This nonprovisional application is a continuation of U.S. application Ser. No. 15/510,849 which was filed on Mar. 13, 2017, which is a National Phase of International Application No PCT/EP2015/072121, which was filed on Sep. 25, 2015, and which claims priority to German Patent Application No. 10 2014 114 026.5, which was filed in Germany on Sep. 26, 2014, and which are all herein incorporated by reference.

BACKGROUND OF THE INVENTION

Field of the Invention

The present invention relates to a conductor terminal and a method for assembling a conductor terminal.

Description of the Background Art

In general terms, the invention relates to the field of electrical conductor connection technology. Conductor terminals, e.g. in the form of terminal strips, are known from DE 10 2011 106 640 A1 or EP 02 53 239 B1, for example.

SUMMARY OF THE INVENTION

It is therefore an object of the invention to develop conductor terminals of this kind in respect of ergonomics, production costs and/or ease of assembly.

The object is achieved in an exemplary embodiment by a conductor terminal having the following features: at least one insulating-material housing; at least one contact insert arranged at least partially in the insulating-material housing and having at least one contact piece and at least one clamping spring; wherein the contact piece, together with the clamping spring, forms at least one conductor clamping point for an electrical conductor to be contacted by means of the conductor terminal, which electrical conductor can be acted upon at the conductor clamping point by a spring force of the clamping spring; at least one actuating lever pivotably supported in the insulating-material housing for actuating the clamping spring, wherein the actuating lever can be pivoted from a closed position into an open position and vice versa relative to the insulating-material housing and/or the contact piece, and an electrical conductor inserted into the conductor terminal is not acted upon by the spring force of the clamping spring at the conductor clamping point at least in the open position, wherein the actuating lever is supported in a floating manner and is supported at least partially on the contact piece, e.g. directly on the contact piece, at least in the open position, wherein the actuating lever is supported on an upper section of the contact piece, and a conductor reception chamber for receiving the electrical conductor to be contacted is arranged between the upper section and a contact point of the contact piece, at which contact point the conductor clamping point is formed together with an end region of the clamping spring.

Owing to the floating support, the actuating lever automatically adapts to the force conditions which arise and is therefore subject to reduced wear compared with fixed axis support. Moreover, the floating support allows simple mounting of the actuating lever, including subsequent mounting, when the insulating-material housing is already closed. Supporting the actuating lever on the contact piece, which is generally manufactured from metal, offers a robust counter support for the actuating lever. Accordingly, the contact piece, together with a corresponding part of the actuating lever, forms a pivot bearing which exhibits very little wear. Since the actuating lever can advantageously be manufactured from plastic, e.g. an insulating material of the insulating-material housing, there is moreover an advantageous low-friction and simultaneously low-wear pairing of materials with the metallic contact piece.

In addition, the actuating lever, at least at certain pivoting angles, can also be supported by means of its rear side on an inner wall of the insulating-material housing.

The actuating lever can act directly or indirectly on the clamping spring in order to cancel the clamping effect of the clamping spring at the conductor clamping point and in order not to subject an electrical conductor inserted into the conductor terminal to the spring force of the clamping spring or to open the clamping point.

In this case, the clamping spring can subject the electrical conductor directly to the spring force at the conductor clamping point, by virtue of the clamping spring touching the conductor, or indirectly via an intermediate component.

According to an advantageous development of the invention, it is envisaged that the contact piece has a clamping section, in which the contact point is arranged, and a bearing section, on which the actuating lever is supported at least partially in the open position, wherein the conductor reception chamber is arranged between the clamping section and the bearing section. This has the advantage that disassociation of the regions of the bearing section and the clamping section is achieved by means of the intervening region of the conductor reception chamber. In this way, more advantageous structural and space conditions of the conductor terminal are created.

According to an advantageous development of the invention, it is envisaged that the clamping spring has a bearing leg, via which the clamping spring is supported on the contact piece on a first side of the bearing section, said side facing the conductor reception chamber. This has the advantage that the clamping spring is reliably supported with low material and production costs.

According to an advantageous development of the invention, it is envisaged that the actuating lever is supported at least partially on a second side of the bearing section of the contact piece at least in the open position, said side facing away from the conductor reception chamber. This has the advantage that the actuating lever is reliably supported with low material and production costs.

According to an advantageous development of the invention, it is envisaged that the bearing section is connected to the clamping section by means of a connecting section of the contact piece. This enables the contact piece to be made available in a simple manner, together with the bearing section and the clamping section, as an integral component, e.g. in the form of a stamped and bent part. Here, the connecting section can advantageously be taken laterally around the region in which the conductor is to be received in the conductor reception chamber. In this way, the connecting section can simultaneously form a lateral boundary of the conductor reception chamber. Thus, the arrangement comprising the bearing section, the connecting section and the clamping section can be formed in a U shape, for example. In particular, the clamping section, the bearing section and the connecting section can be formed integrally from one material, in particular metal.

According to an advantageous development of the invention, it is envisaged that the bearing section of the contact piece is designed as a plate, in particular as a metal plate. In particular, the first side of the bearing section and the second side of the bearing section can be spaced apart from one another by the thickness of the plate of the bearing section.

According to an advantageous development of the invention, it is envisaged that a closed force chain is formed, at least in the open position of the actuating lever, from a catch element of the clamping spring to the bearing leg of the clamping spring via a tension arm, acting on the catch element, of the actuating lever, via the outer contour thereof, and via the first side and the second side of the bearing section. This allows kinematically advantageous routing of forces while simultaneously subjecting the parts of the insulating-material housing to little force. By means of a closed force chain of this kind, which is characterized by the fact that the force vector sum gives the value zero, the forces exerted by the open position of the actuating lever are transmitted in a particularly efficient way to the bearing leg of the clamping spring.

According to an advantageous development of the invention, it is envisaged that the conductor reception chamber is separated from the actuating lever by the upper section, in particular the bearing section, of the contact piece. This has the advantage that disassociation of the regions of the bearing section and the clamping section is achieved by means of the intervening region of the conductor reception chamber. In this way, more advantageous structural and space conditions of the conductor terminal are created.

According to an advantageous development of the invention, a tension arm of the actuating lever is arranged between the outer contour of the actuating lever and a grip region of the actuating lever. This has the advantage that a large lever arm on the actuating lever can be achieved, despite compact external dimensions of the conductor terminal.

According to an advantageous development of the invention, the actuating lever has an eccentric outer contour, by means of which the actuating lever is supported on the contact piece. The pivot bearing contour of the actuating lever is thus formed by the eccentric outer contour. This has the advantage that the actuating lever can exert relatively large forces for the actuation of the clamping spring with low manual actuating forces (high leverage), this being associated with pleasantly smooth operation of the conductor terminal.

According to an advantageous development of the invention, the actuating lever can be moved in translation relative to the insulating-material housing and/or the contact piece in addition to a rotary motion during pivoting. As a result, the actuating lever has enhanced degrees of freedom during the pivoting motion, this in turn being conducive to low-wear support, easy mounting of the actuating lever in the insulating-material housing of the conductor terminal and pleasant tactile properties during actuation.

According to an advantageous development of the invention, the actuating lever has at least one tension arm, which engages behind a catch element of the clamping spring, thus allowing the clamping spring to be deflected by the tension arm by the imposition of a tension on the clamping spring as the actuating lever is pivoted into the open position. This has the advantage that the clamping spring can simultaneously exerts a reaction force on the actuating lever, which urges the latter in the direction of the closed position. It is furthermore possible in this way to obtain a self-locking toggle lever principle with little effort in respect of the actuating lever, thus ensuring that little or no additional effort is required to lock said lever in the open position.

According to an advantageous development of the invention, the clamping spring has a window-like aperture, in which the tension arm of the actuating lever engages. In this way, the catch element of the clamping spring can be implemented by means of an upper edge of the window-like aperture or, in other words, by a transverse web, formed there, of the clamping spring. This enables the clamping spring to be coupled to the tension arm in a simple and low-cost way. All that is required is to produce the window-like aperture by punching a piece of material out of the material of the clamping spring. It is furthermore possible in this way to create a self-coupling system, in which, with the clamping spring already inserted in the insulating-material housing, the actuating lever can be inserted into the insulating-material housing and the tension arm can then snap into the window-like aperture. After this, the tension arm engages behind the catch element, and from then on, therefore, actuation of the clamping spring is possible by pivoting the actuating lever.

According to an advantageous development of the invention, the conductor terminal has a first latch, by which the actuating lever is latched in the open position. This has the advantage that the actuating lever remains in a defined location in the open position without having to be held by a user. This allows practical and ergonomic handling of the conductor terminal and, particularly in the case of a large number of conductor terminals, e.g. a terminal strip arrangement, leads to simplified handling.

According to an advantageous development of the invention, the first latch has a first lever latch, which is part of the actuating lever, and a first contact piece latch, which is part of the contact piece. The first lever latch and the first contact piece latch interact with one another to latch the actuating lever in the open position. Thus, for example, the first lever latch can be designed as a groove, trough or some other depression in the actuating lever, and the first contact piece latch can be designed as a projecting nose, contact rim or similar projection matched in terms of shape to the first lever latch. A reversed association is also advantageous, with the first lever latch being designed as a nose or some other projection and the first contact piece latch being designed as a groove or some other depression. In particular, the first contact piece latch can be formed by the front rim or a rounded front edge on the front end of an upper contact-piece section facing the actuating lever.

According to an advantageous development of the invention, the conductor terminal has a second latch, by means of which the actuating lever is latched in the closed position. This has the advantage that the actuating lever can be held in a defined manner in the closed position and does not open accidentally.

According to an advantageous development of the invention, the second latch has a second lever latch, which is part of the actuating lever, and a second housing latching means, which is part of the insulating-material housing. The second lever latch and the second housing latch interact with one another to latch the actuating lever in the closed position.

According to an advantageous development of the invention, the actuating lever has mounting pins, which project parallel to the axis of rotation of the pivoting movement and are designed to secure the actuating lever against removal of the actuating lever from the insulating-material housing. In this way, the actuating lever supported in a floating manner can be secured in operating situations of the conductor terminal in which the actuating lever is not held in the insulating-material housing in some other way, e.g. by the clamping spring. Here, the mounting pins do not function, or at least do not primarily function, to support the actuating lever in the insulating-material housing for purposes of carrying out the pivoting movement but mainly as a securing component against removal of the actuating lever from the insulating-material housing.

According to an advantageous development of the invention, the insulating-material housing has a lever insertion passage for the insertion of the actuating lever, wherein the lever insertion passage has a guide contour for guiding the mounting pins, at least during the insertion of the actuating lever. In this way, the mounting pins not only have the function of securing against removal of the actuating lever but also a further function, namely a guiding function for the actuating lever during insertion into the insulating-material housing. Owing to the guidance of the mounting pins along the guide contour in the lever insertion passage, those regions of the actuating lever which are to be arranged in the insulating-material housing travel along a defined path which, by virtue of the configuration of the guide contour, is designed in such a way that the lever reaches its desired end position in the insulating-material housing and is not hindered from being inserted during this process by other components, such as the clamping spring. Moreover, it is ensured that the tension arm of the actuating lever ultimately engages behind the catch element of the clamping spring, thus allowing the actuating lever to perform its function of actuating the clamping spring.

According to an advantageous development of the invention, the part of the contact piece on which the actuating lever is supported, at least in the open position, is designed as a ramp which falls in the direction of rotation of the actuating lever during opening. It is thereby possible to reduce the required actuating forces which have to be applied to the actuating lever for pivoting into the open position. The ramp can be designed as a linear ramp or as a nonlinear ramp, i.e. with a contour which falls in a linear fashion or with a contour which falls in a nonlinear fashion, e.g. a contour which falls in a progressive or degressive way.

The object stated at the outset is furthermore achieved by a method for assembling a conductor terminal method for assembling a conductor terminal as claimed in one of the preceding claims, having the following steps, which are to be carried out in the sequence indicated: provision of the insulating-material housing together with the contact insert already arranged therein, and insertion of the actuating lever, at least with the pivot bearing region thereof, into the insulating-material housing through a lever insertion passage of the insulating-material housing.

This has the advantage of simple and rapid assembly of the conductor terminal. Here, assembly of the conductor terminal should be taken to mean the fitting together of the individual components of the conductor terminal to give the finished, ultimately functional conductor terminal.

To provide the insulating-material housing, together with the contact insert already arranged therein, the housing parts of the insulating-material housing, e.g. two housing half shells, can be fitted with the components of the contact insert before assembly and then fitted together.

The abovementioned method can advantageously be developed as follows: provision of the insulating-material housing together with the contact insert already arranged therein; deflection of the clamping spring by insertion of an aid, e.g. a core or a conductor, into a conductor insertion opening of the conductor terminal; insertion of the actuating lever, at least with the pivot bearing region thereof, into the insulating-material housing through a lever insertion passage of the insulating-material housing; removal of the aid from the conductor terminal.

This has the advantage that it is an even simpler matter to insert the actuating lever into the insulating-material housing while avoiding unwanted premature contact with the clamping spring. Unwanted abrasion of material or scratching of the actuating lever and the risk of abrasion of material on the conductor terminal can thereby be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
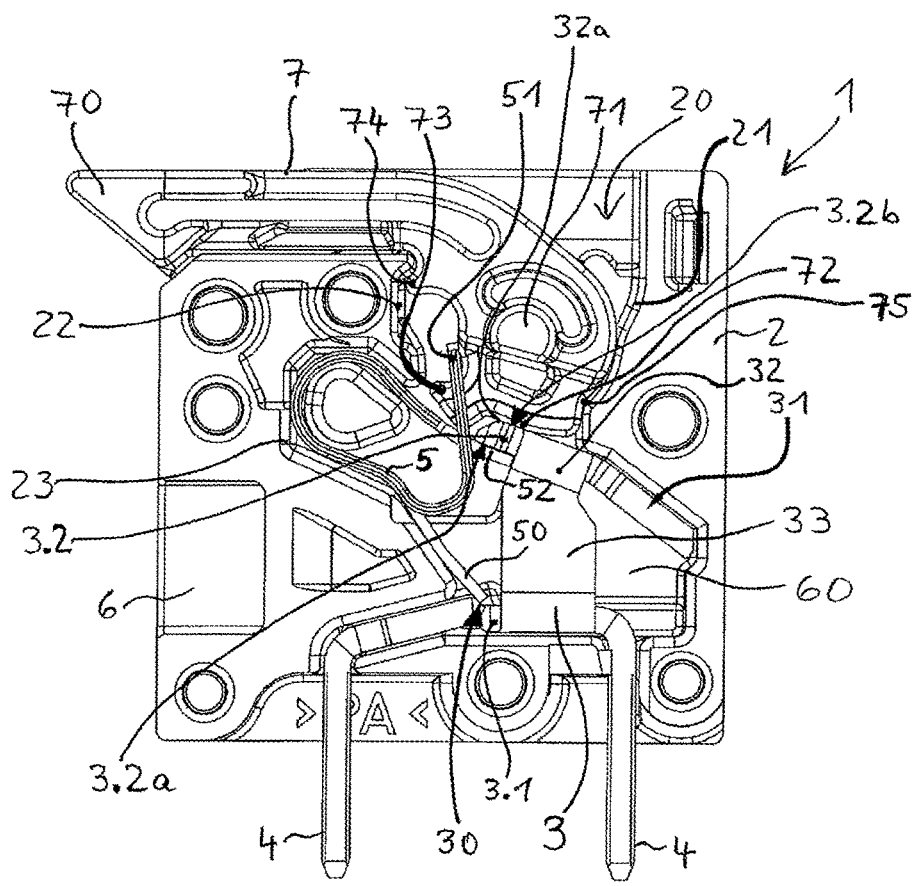
FIGS. 1 to 6 show a conductor terminal in a first embodiment.
Figure 2:
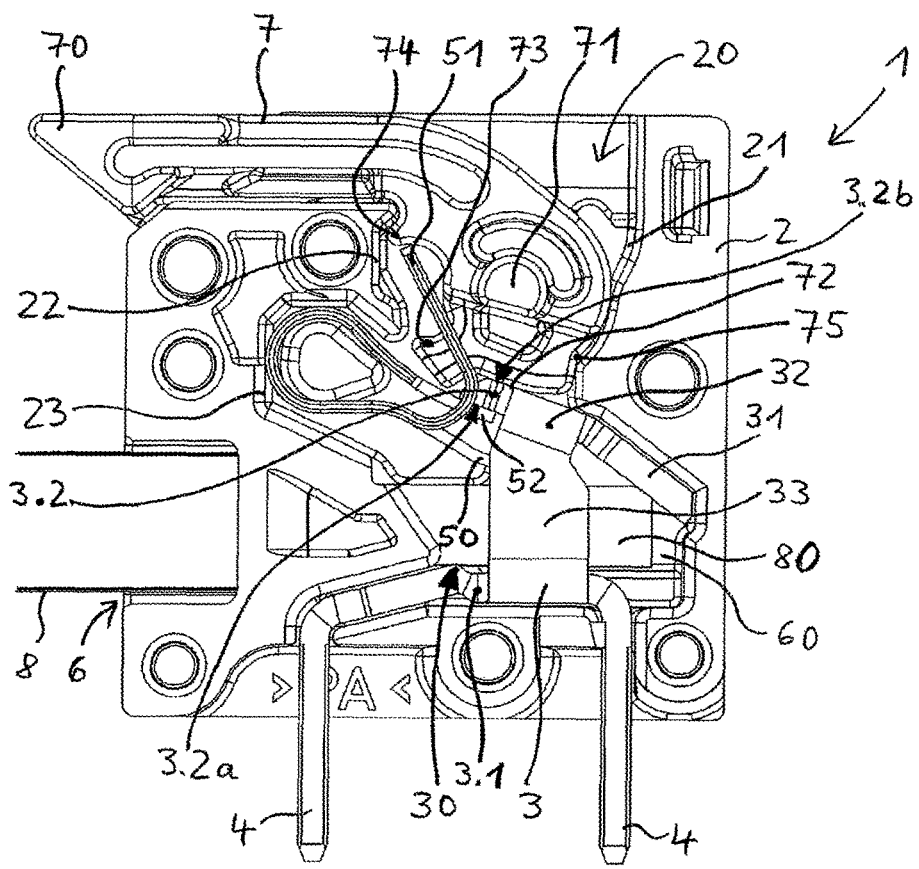
Figure 3:
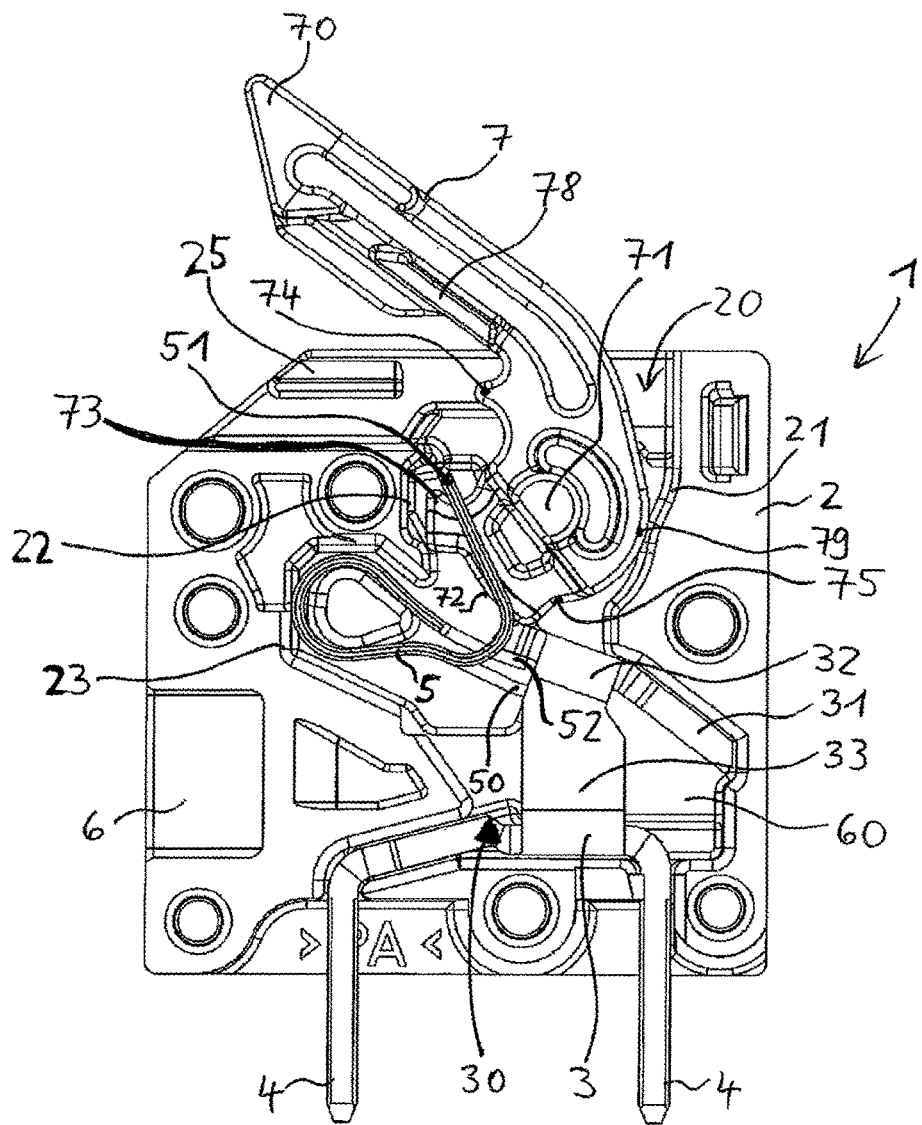
Figure 4:
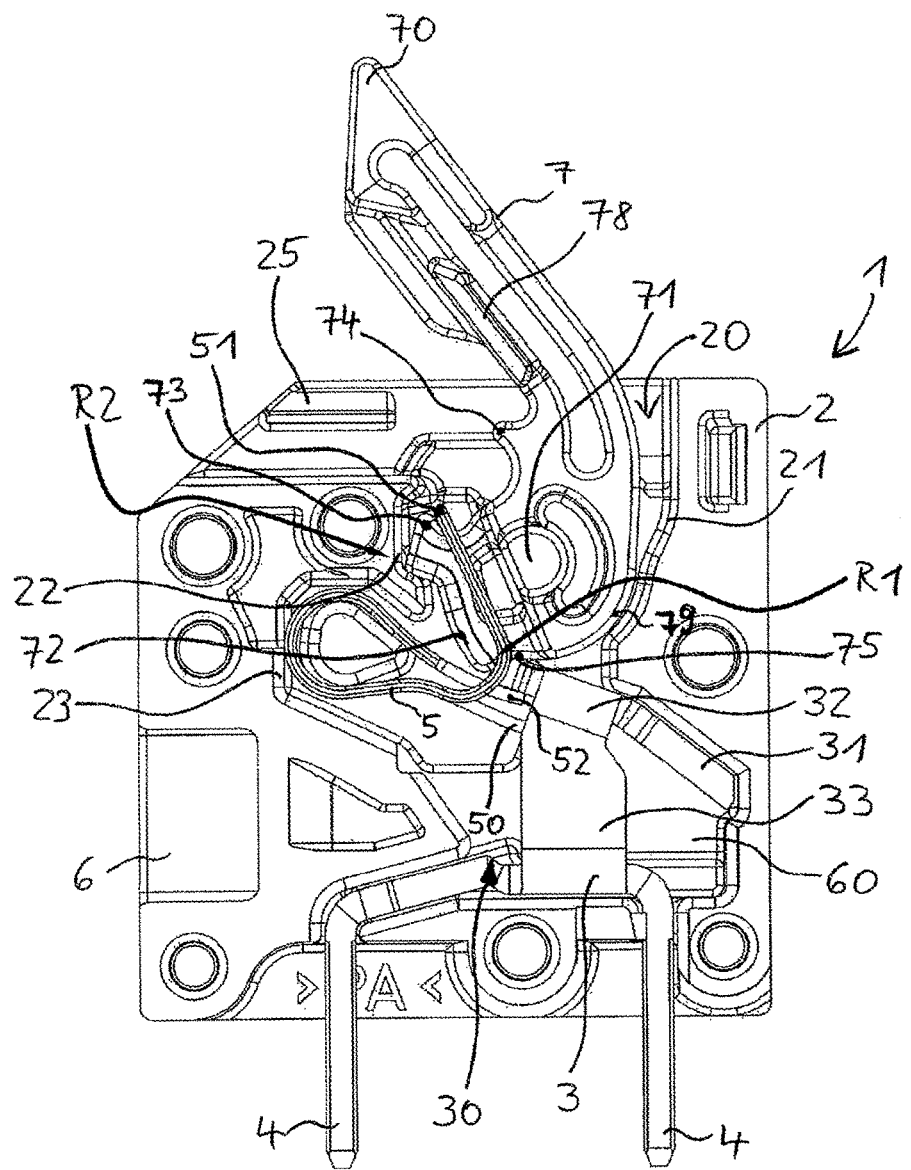

FIGS. 1 to 4 show the conductor terminal in a side view with the insulating-material housing opened, allowing the internal structure to be seen, in various actuating positions of the actuating lever. Here, FIG. 1 shows the conductor terminal in the closed position without a conductor connected and FIG. 2 shows it in the closed position with a conductor connected. FIG. 3 shows the conductor terminal in a partially open position and FIG. 4 shows it in a completely open position, in each case without a conductor connected. The structure and operation of the conductor terminal are explained in greater detail below with reference to FIGS. 1 to 4.

The conductor terminal 1 has an insulating-material housing 2, which can be designed as a flat, substantially cuboidal housing, for example, allowing a plurality of conductor terminals to be lined up next to one another. The insulating-material housing 2 can be in the form of two housing half shells, for example, which are connected to one another after the installation of the internal components. The insulating-material housing 2 advantageously receives the internal components, while the open side is finally closed with a cover 9 or an adjoining conductor terminal 1. Accordingly, FIGS. 1 to 4 show a view of the conductor terminal with the cover part 9 removed.

As further components, the conductor terminal 1 has at least one contact piece 3, a clamping spring 5 and an actuating lever 7. Together with the clamping spring 5, the contact piece 3 forms a contact insert of the conductor terminal 1. The clamping spring 5 and the contact piece 3 are manufactured completely from electrically conductive material, in particular from metal, for example. In principle, the actuating lever can be manufactured from any materials, e.g. from the same material as the insulating-material housing 2, e.g. from a plastics material.

The insulating-material housing 2 has a conductor insertion opening 6, through which an electrical conductor 8 to be connected can be inserted into the conductor terminal 1. The conductor 8 can be guided, with an insulated end 80 first, through the conductor insertion opening 6 and into a conductor reception chamber 60, as FIG. 2 shows. The contact piece 3 is situated in the region of the conductor reception chamber 60. The conductor reception chamber 60 can be of funnel-shaped design, in particular. For external electrical contacting of the conductor terminal 1, the contact piece 3 can have electrically conductive contact pins 4, which project from the insulating-material housing 2. When looking into the conductor connection opening 6, the contact piece 3 can be designed, for example, as a U-shaped component, which extends from a lower section, indicated by the reference sign 3, via a connecting section 33, to an upper section 32. The upper section 32 is connected to a beveled section 31 of the contact piece 3, said section facing in the conductor insertion direction and acting as a conductor insertion bevel. The beveled section 31 can also be designed as part of the housing 2 of the conductor terminal 1.

The clamping spring 5 extends from a first end region 52, via a plurality of arcuate regions, to a second end region 50. Together with a contact point of the contact piece 3, the second end region 50 forms a conductor clamping point 30, by means of which a connected electrical conductor can be clamped between the second end region 50 and the contact piece 3, as shown especially by FIG. 2. Here, the clamping spring 5 is correspondingly deflected.

The clamping spring 5 furthermore has a catch element 51. In the case of an integral design of the clamping spring 5, this can be produced by punching out an inner section of the material of the clamping spring. The punched-out inner section then forms the second end region 50 of the clamping spring 5. That part of the clamping spring which has the catch element 51 and then has a window-like aperture 59 (visible in FIGS. 10 and 11), through which the first end region 52 of the clamping spring 5 extends, is angled into the upward-pointing position shown in FIG. 1. In this case, a transverse web situated at the end of the window-like aperture 59, for example, rests on the tension arm 73 of the actuating lever 7 and forms the catch element 51.

The clamping spring 5 is received and held within a clamping spring reception region of the insulating-material housing 2, which is bounded by an inner wall 23 of the insulating-material housing 2. The clamping spring 5 is supported from below by the first end region 52 thereof on one end of the upper section 32 of the contact piece 3. The clamping spring 5 is supported by the second end section 50 thereof on the lower section of the contact piece 3 or on the connected electrical conductor 8, 80.

The actuating lever 7 has a grip region 70, which is designed for manual actuation of the actuating lever 7. In the closed position, the actuating lever 7 is pivoted downward and protrudes only slightly from the insulating-material housing 2, in particular only in the grip region 70. In the partially open position and in the completely open position, the actuating lever 7 is pivoted upward and protrudes at the top from the insulating-material housing 2.

The actuating lever 7 furthermore has two mounting pins 71 projecting laterally from the material of the lever 7. However, the actuating lever 7 is not supported in the insulating-material housing 2 via the mounting pins 71. On the contrary, the mounting pins 71 serve to prevent the actuating lever 7, which is supported in a floating manner and thus loosely in the insulating-material housing 1, from being lost from said housing. Further details of this will be given later in connection with the mounting of the actuating lever 7 in the insulating-material housing 2.

The floating support for the actuating lever 7 is achieved by supporting the actuating lever 7 via an outer contour 72 of the actuating lever 7, said outer contour forming a supporting surface via which the actuating lever 7 is supported relative to the contact piece 3, in particular relative to the upper section 32 thereof.

The actuating lever 7 has a tension arm 73, which is in the form of a projecting nose, for example, and which engages in the window aperture 59 of the clamping spring 5 and thereby engages behind the catch element 51. The actuating lever 7 furthermore has a second lever latch 74, which is in the form of a projecting nose, for example, and by means of which the actuating lever 7 can be latched and thus fixed in its closed position shown in FIG. 1 by latching of the second lever latch 74 with a correspondingly shaped latching section, designed as a housing latch, on an inner wall 22 of the insulating-material housing 2.

The actuating lever 7 furthermore has a first lever latch 75, in the form of a recess or a groove, for example. By means of this first lever latch 75, the actuating lever 7 can be fixed in its completely open position, namely by latching the first lever latch 75 with a part of the contact piece 3 serving as an abutment, as can be seen especially in FIG. 4. In this case, the first lever latch 75 latches on an edge, e.g. the front rim 32a or the possibly rounded front edge on the front end of the upper section 32 of the contact piece 3. This is shown as latching point R1 in FIG. 4. An additional latching point R2 can be formed between a lower region of the tension arm 73 and an offset arranged, for example, on the inner housing wall 22 of the insulating-material housing 2.

When the actuating lever 7 is actuated from the closed position into the partially open or completely open position, it pulls the catch element 51 of the clamping spring 5 along with it by means of the tension arm 73, i.e. the catch element 51 is deflected upward. Owing to the connection of the catch element 51 to the second end section 50 in the lower region of the clamping spring 5, this region too is moved upward, with the result that the second end section 50 is pulled away from the conductor clamping point 30. In this way, an electrical conductor 8 can be removed from the conductor terminal 1 or inserted with less effort. Particularly in the case of finely wired embodiments of the electrical conductor, it is only by this means that insertion into the conductor terminal 1 is possible at all.

During its movement from the closed position into the partially or completely open position or during the correspondingly reversed movement of the actuating lever 7, the outer contour 72 of the actuating lever 7 slides on the contact piece 3. Here, the outer contour 72 is designed in such a way that the actuating lever 7 moves relative to the insulating-material housing 2 and hence also relative to the contact piece 3 during the pivoting movement. This can be observed from an upward movement of the mounting pins 71 during the opening movement or a downward movement during the closing movement of the actuating lever 7, for example.

During a pivoting movement, the actuating lever 7 is thus, at least normally, supported not via the mounting pins 71 but via its rear outer contour 72 on the surrounding insulating-material housing 2, said outer contour being supported relative to the upper section 32 of the contact piece 3 and thus forming a pivot bearing surface. In addition, the lever 7 can also be supported, at least in certain pivoting angles, by means of a rear side 79 on an inner wall 21 of the insulating-material housing 2.

In the completely open position, as illustrated in FIG. 4, the clamping spring 5 holds the actuating lever 7 in the illustrated position owing to the tensile force which it exerts on the catch element 51, wherein the fixing is assisted by the force of the clamping spring 5 via the first lever latch 75 in conjunction with the first contact piece latch.

When the actuating lever 7 is in the closed position and the electrical conductor 8 is connected, as shown in FIG. 2, the clamping spring 5 is deflected. In this state, the catch element 51 of the clamping spring 5 therefore does not rest on the tension arm 73 of the actuating lever 7 and is situated in a free space underneath the actuating lever 7. In this state, the actuating lever 7 is fixed in the illustrated position in the insulating-material housing by the second lever latch 74 in conjunction with the second housing latch.

As can be seen, the actuating lever 7 and the support thereof on the contact piece 3 are provided at a point which is remote from the contact point of the contact piece 3 or the conductor clamping point 30, such that the conductor reception chamber 60 is arranged therebetween. Here, the actuating lever 7 is supported on a bearing section 3.2 of the contact piece 3, namely on a second side 3.2*b* (in this case the upper side) of the bearing section 3.2, said side facing away from the conductor reception chamber 60. The bearing leg 52 of the clamping spring 5, on the other hand, is supported on the opposite side of the contact piece 3, namely on a first side 3.2*a* (in this case the lower side) of the bearing section 3.2, said side facing the conductor reception chamber 60.

Figure 5:
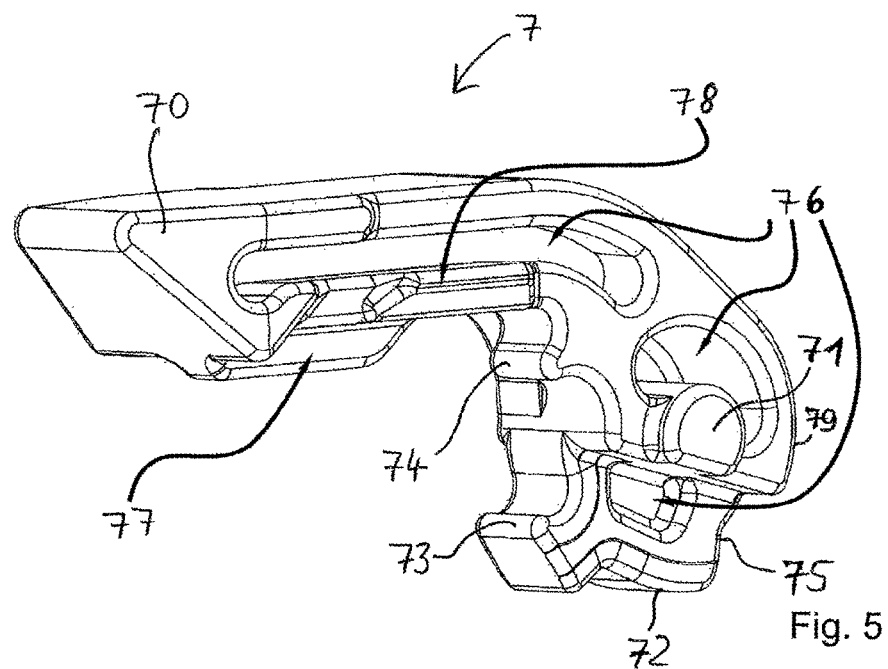
Figure 6:
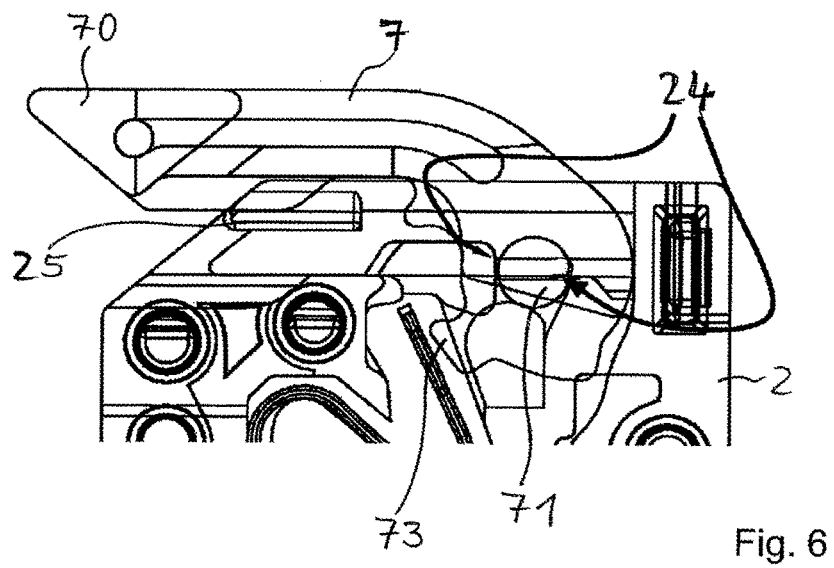

FIG. 5 shows the actuating lever as an individual component in an isometric view. It can be seen, in particular, that the mounting pins 71 can be flattened on the lower side. This can be helpful for the insertion of the actuating lever 7 into the already closed insulating-material housing 2. The actuating lever 7 can then also be inserted from above into the insulating-material housing 2 in a position which corresponds to the completely open position. At the same time, the actuating lever 7 cannot be removed from the insulating-material housing 2 in the closed position. For this purpose a correspondingly designed lever insertion passage 20 having a guide contour 24, the clear width of which is smaller than the largest diameter of the mounting pins 71 and slightly larger than or equal to the diameter in the region of the flattening, is provided in the insulating-material housing 2. Here, FIG. 6 shows the advantageous possibility of inserting the actuating lever 7 through the lever insertion passage 20 into the insulating-material housing 2, of which only the upper region is shown partially in FIG. 6. Here, the mounting pin is inserted in such a way through the tapering lever insertion passage 20 that the mounting pin 71 snaps in behind the housing inner wall as it enters the interior of the insulating-material housing.

It can furthermore be seen that the actuating lever 7 can have apertures 76 and webs 77.

For mounting the actuating lever 7 in the insulating-material housing 2, it can be advantageous if the insulating-material housing 2 is already closed and the contact piece and the clamping spring are already inserted therein. To assist the insertion of the actuating lever 7, the clamping spring can be pre-deflected by an object, e.g. a screwdriver or an electrical conductor, pushed as an aid into the conductor insertion opening 6 as far as the conductor reception region 60, ensuring that the catch element 51 is pivoted counterclockwise, as can be seen in FIG. 2. The actuating lever 7 can then be inserted from above. During this process, the tension arm 73 engages behind the catch element 51, which has been pivoted by the aid.

To fix the actuating lever 7 in the closed position, laterally arranged latch 78 can additionally be present, e.g. arranged laterally on the left and right, which fix the closed actuating lever 7 by means of projecting housing edges 25 of the insulating-material housing 2.

Figure 7:
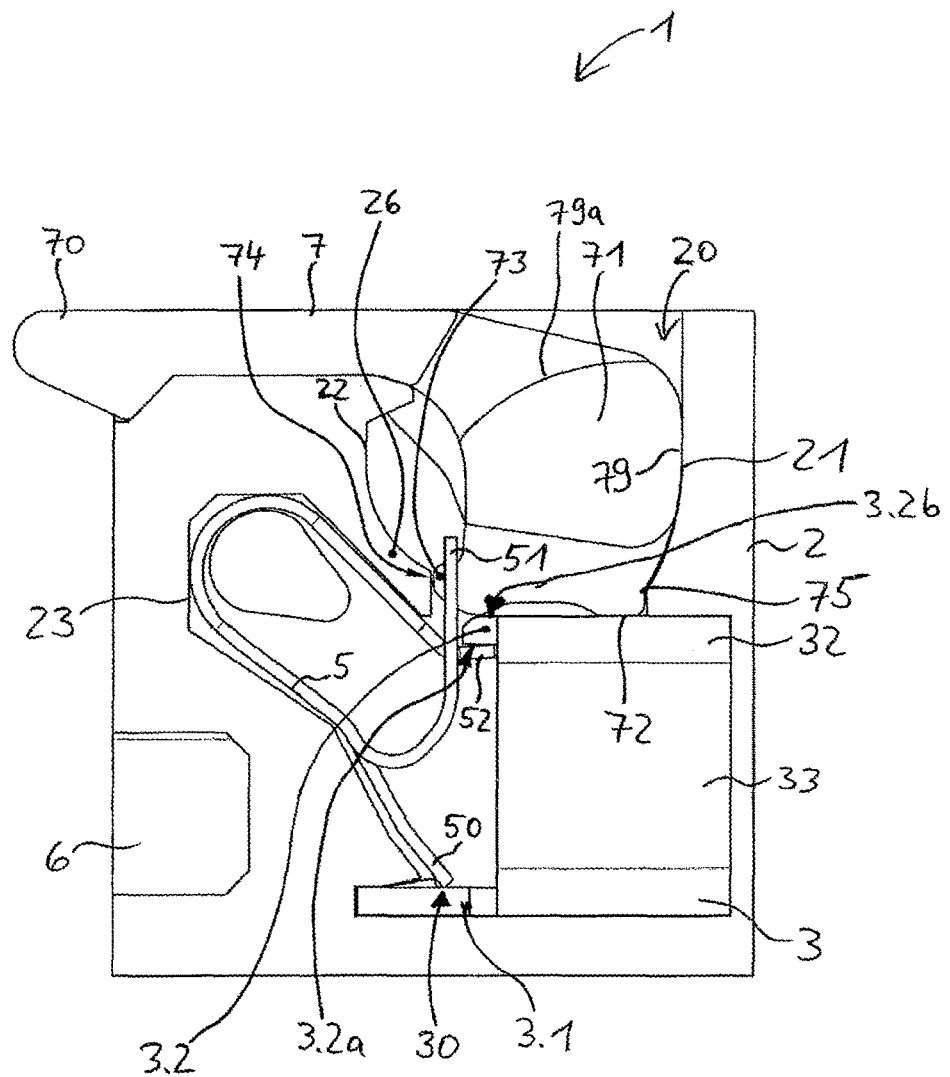
FIGS. 7 to 14 show a conductor terminal in a second embodiment.
Figure 8:
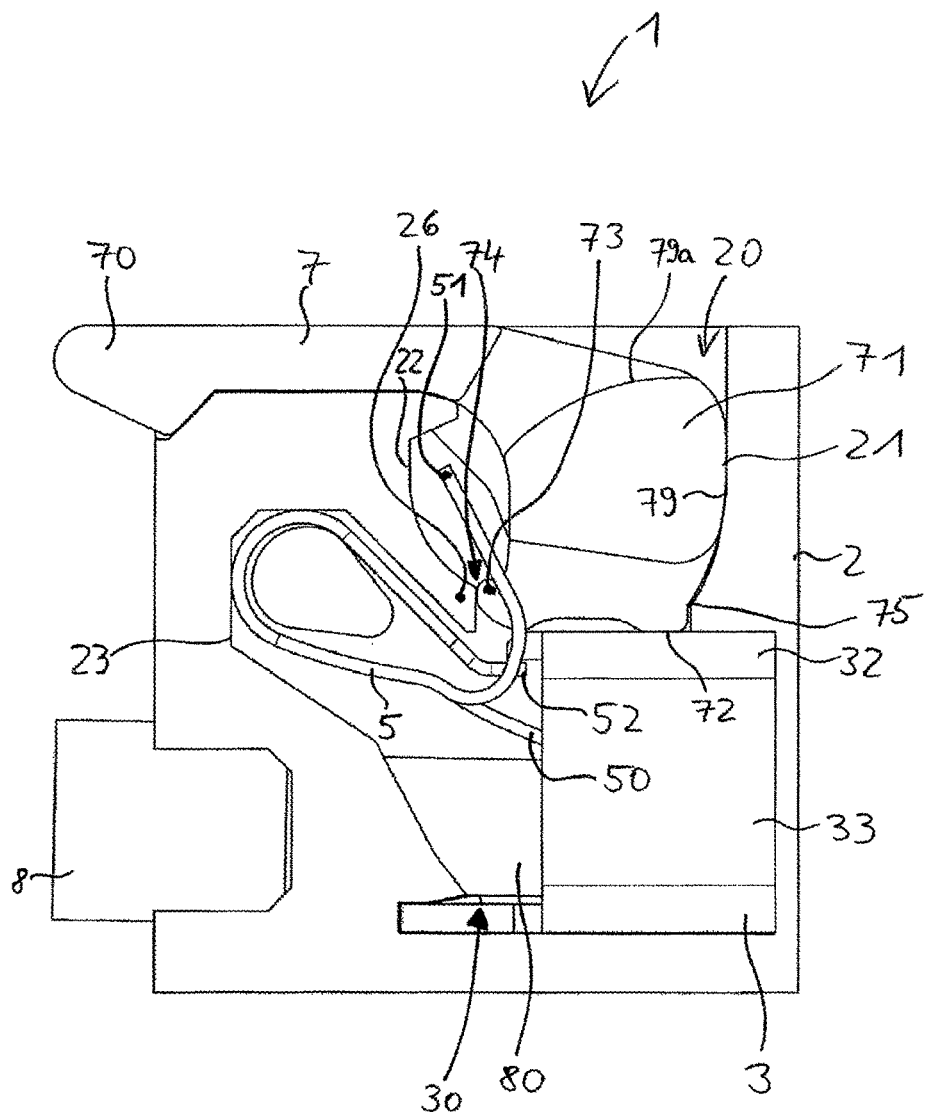
Figure 9:
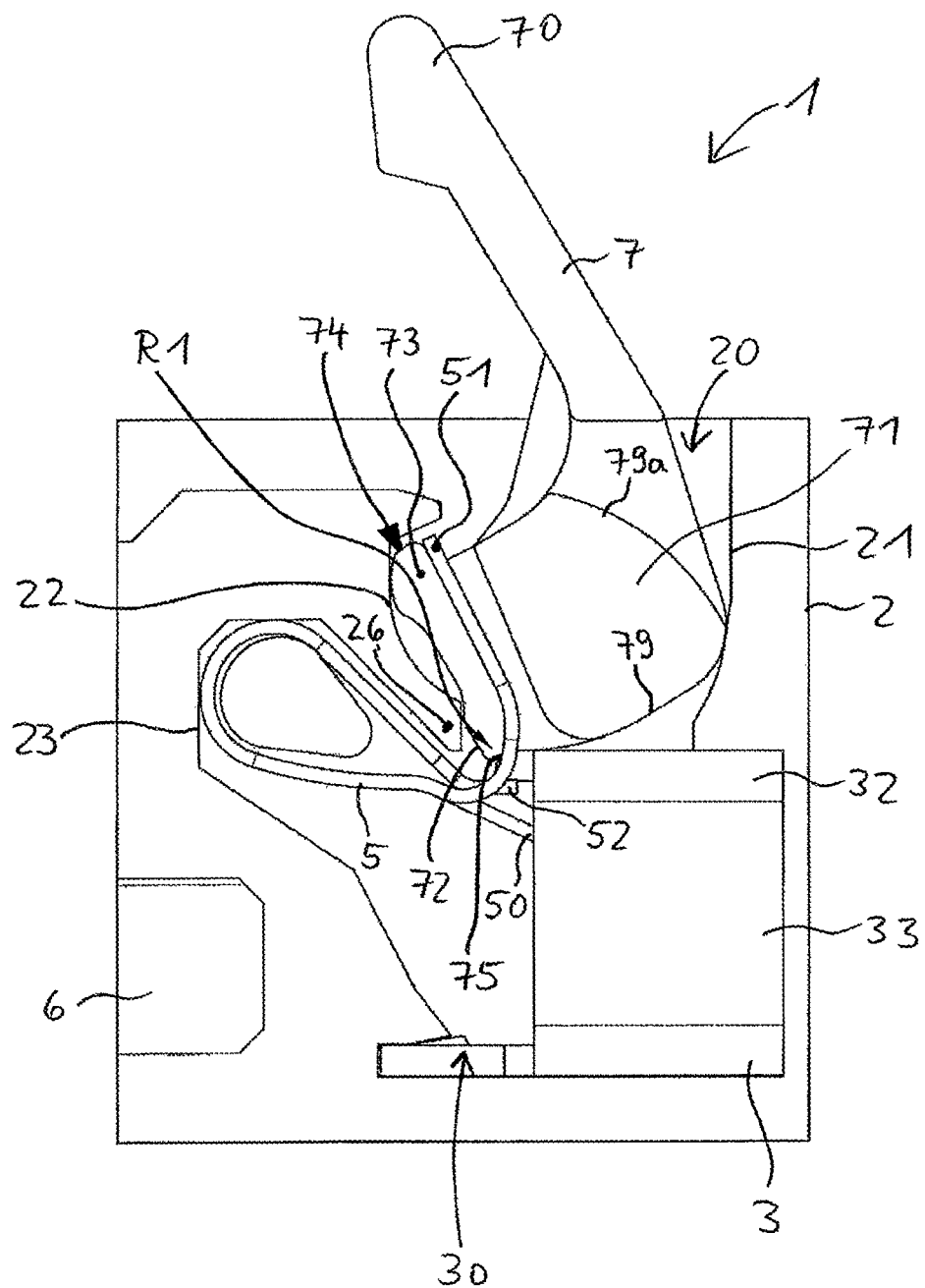

The second embodiment of the conductor terminal, which will now be explained, is illustrated in FIGS. 7 to 9 in similar views and positions to the first embodiments in FIGS. 1, 2 and 4, i.e. in the closed position without a connected conductor in FIG. 7, in the closed position with a connected conductor in FIG. 8, and in the completely open position without a connected conductor in FIG. 9. In many features, the second embodiment is embodied in the same way as the first embodiment; among the ways in which it differs is the different manner of fixing the actuating lever 7 in the closed position. To fix the actuating lever 7 here, a second lever latch 74 is once again provided on said actuating lever, but it is not spaced apart from the tension arm 73, as in the first embodiment, instead being formed on this tension arm 73 itself. Moreover, a web 26 is provided in the insulating-material housing 2, and this web can be formed in the manner of a flexible housing tab, for example. This web 26, which then forms the second housing latch, can thus be deflected with the imposition of a corresponding force, which is not too high, and therefore the fixed closed position can be overcome with a moderate expenditure of force when opening the actuating lever 7.

FIG. 7 shows the actuating lever 7 in the closed position. When the actuating lever 7 is moved into the open position, the second lever latch 74 presses more strongly against the web 26 and deflects the latter somewhat. After a certain open position, the second lever latch 74 snaps over the web 26, thus overcoming the fixing. The actuating lever 7 can then be guided into the open position shown in FIG. 9. In this position, it is fixed by means of latching between the first lever latch 75 and the contact piece 3 (latching point R1), as in the first embodiment.

Figure 10:
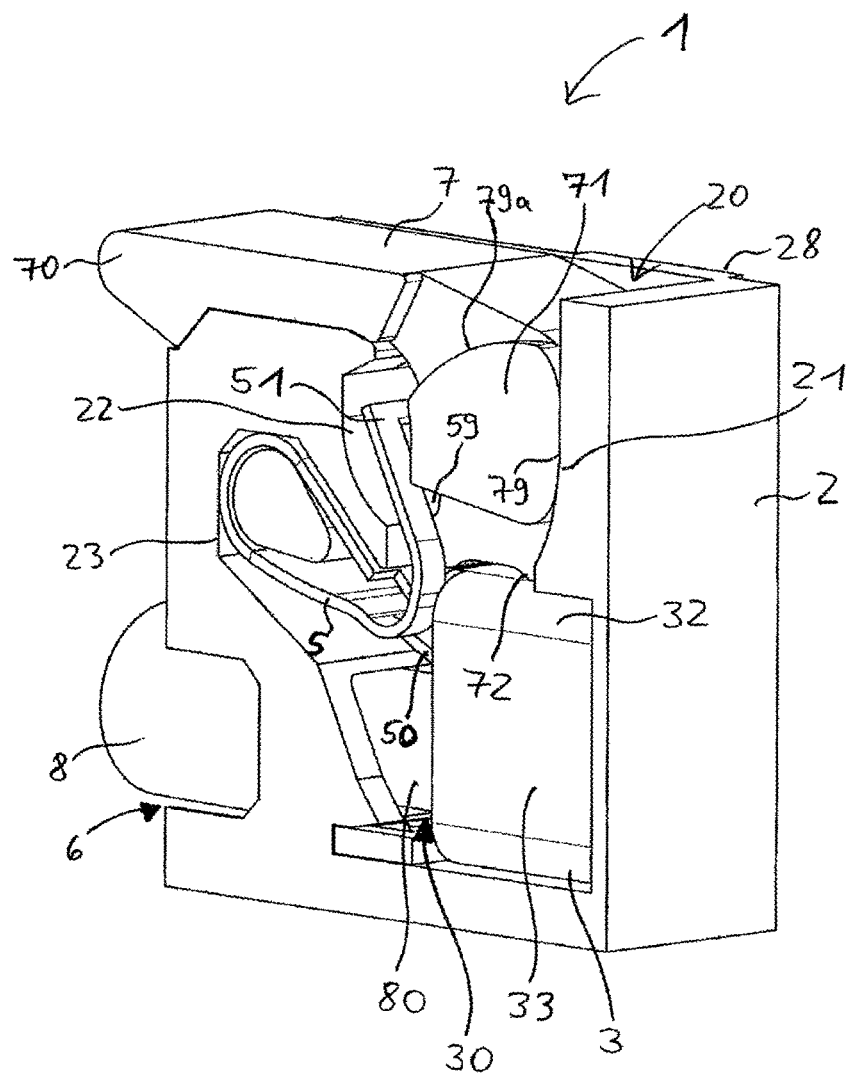
Figure 11:
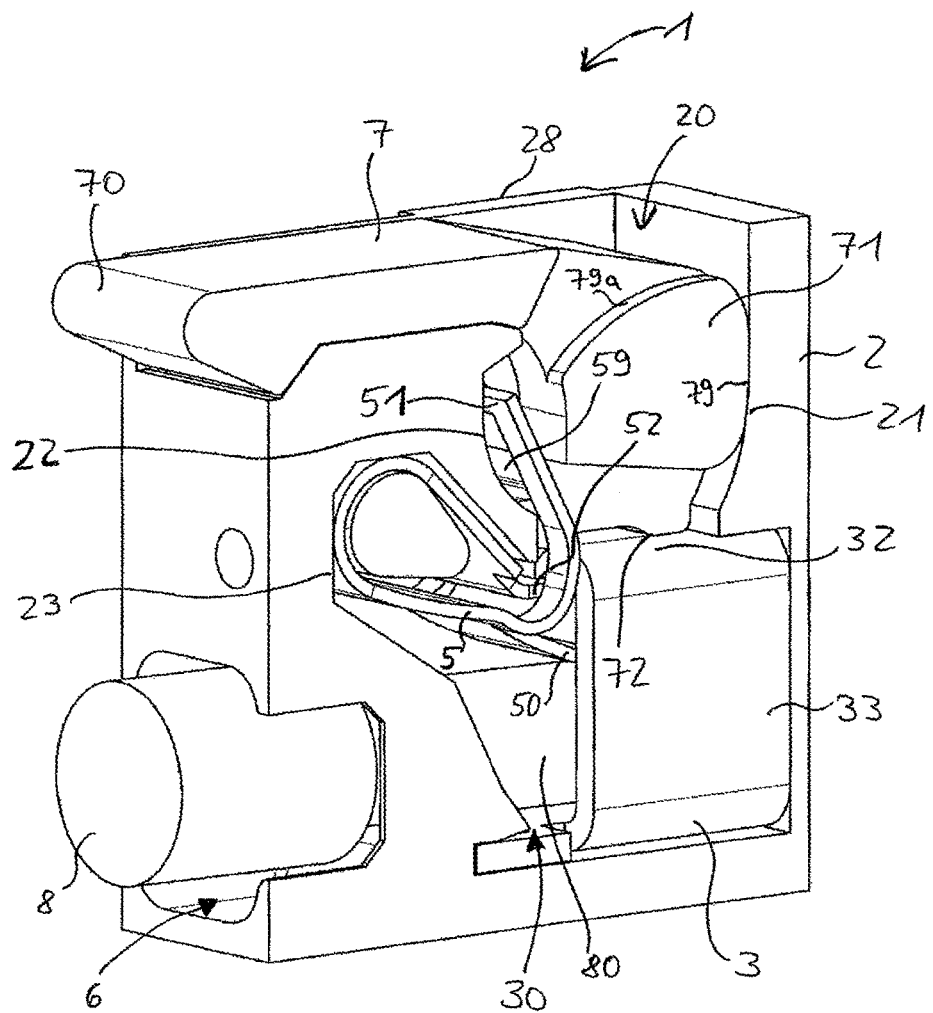
Figure 12:
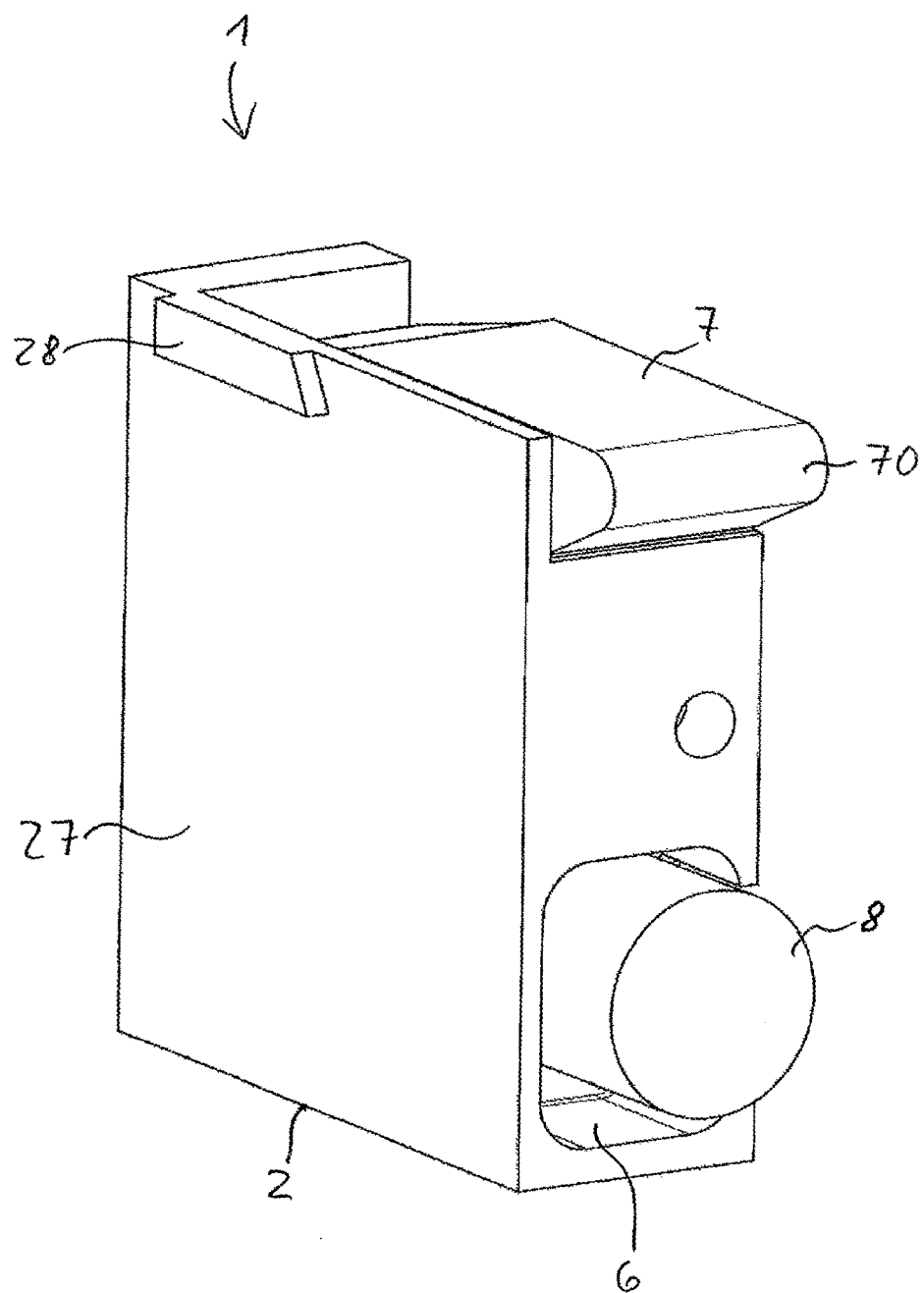
Figure 13:
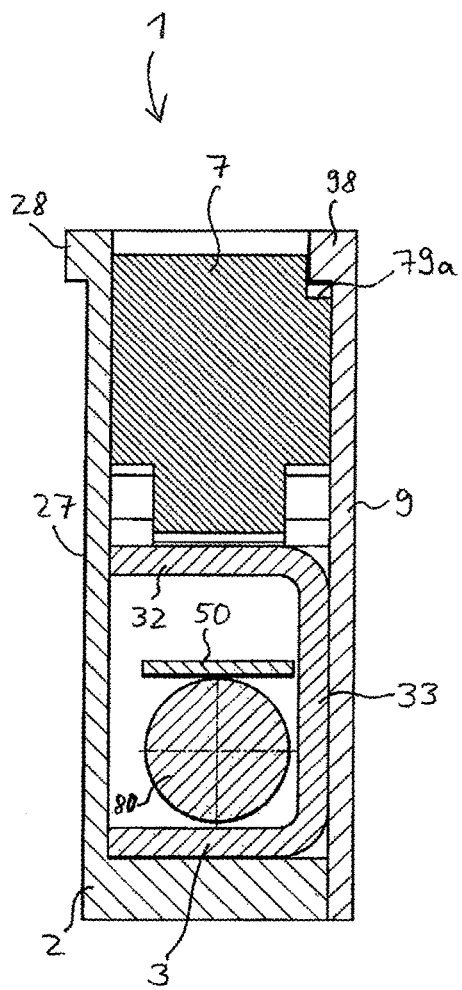

For further clarification, FIG. 10 shows the conductor terminal according to FIG. 8 in an isometric view obliquely from behind, FIG. 11 shows it in isometric view obliquely from the front, and FIG. 12 shows it in another isometric view obliquely from the front, looking toward the side wall 27 of the insulating-material housing 2. As can be seen in the figures, the other side wall can be of partially open design. By lining up a plurality of conductor terminals, an open side wall of one conductor terminal is covered by the closed side wall 27 of the next conductor terminal. For the last open side wall of an in-line arrangement, thus formed, of conductor terminals, a cover plate 9 can be placed on this last conductor terminal, as FIG. 13 shows. At the upper rim, the cover plate 9 and the side wall 27 of a conductor terminal can in each case have a guide section 28, 98, which serves to guide and retain the actuating lever 7 of an adjacent conductor terminal. During its pivoting movement, the actuating lever 7 is supported at least partially on the guide section 28, 98 by means of a guide contour (79*a*) which faces the latter.

Figure 14:
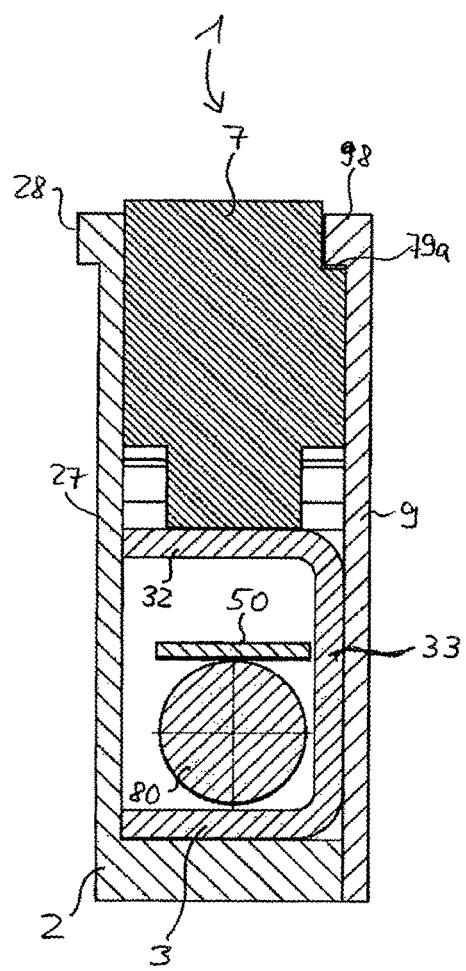

FIGS. 13 and 14 show the conductor terminal according to the second embodiment in a cross-sectioned view. Here, FIG. 13 shows the conductor terminal in the closed position of the actuating lever with the electrical conductor inserted, while FIG. 14 shows it with the actuating lever open and likewise with an electrical conductor inserted.

Figure 15:
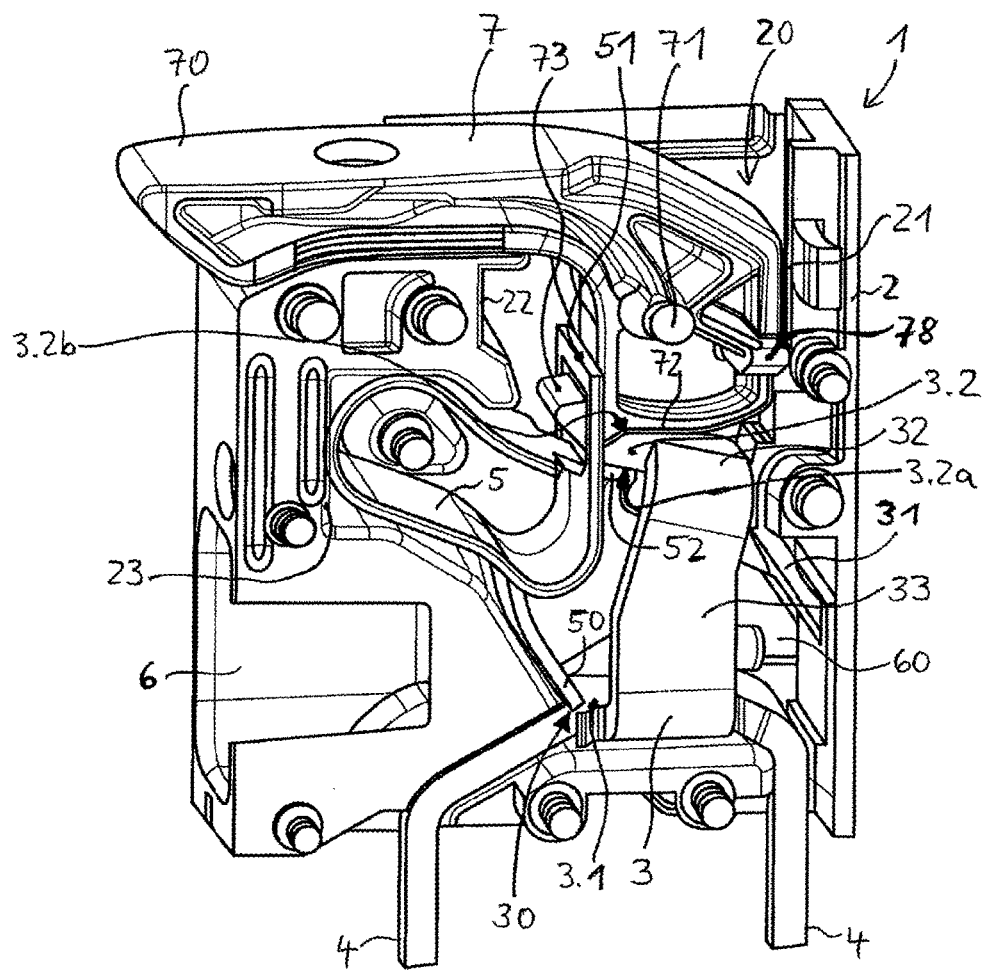
FIGS. 15 to 18 show a conductor terminal in a third embodiment, in each case in different views.
Figure 16:
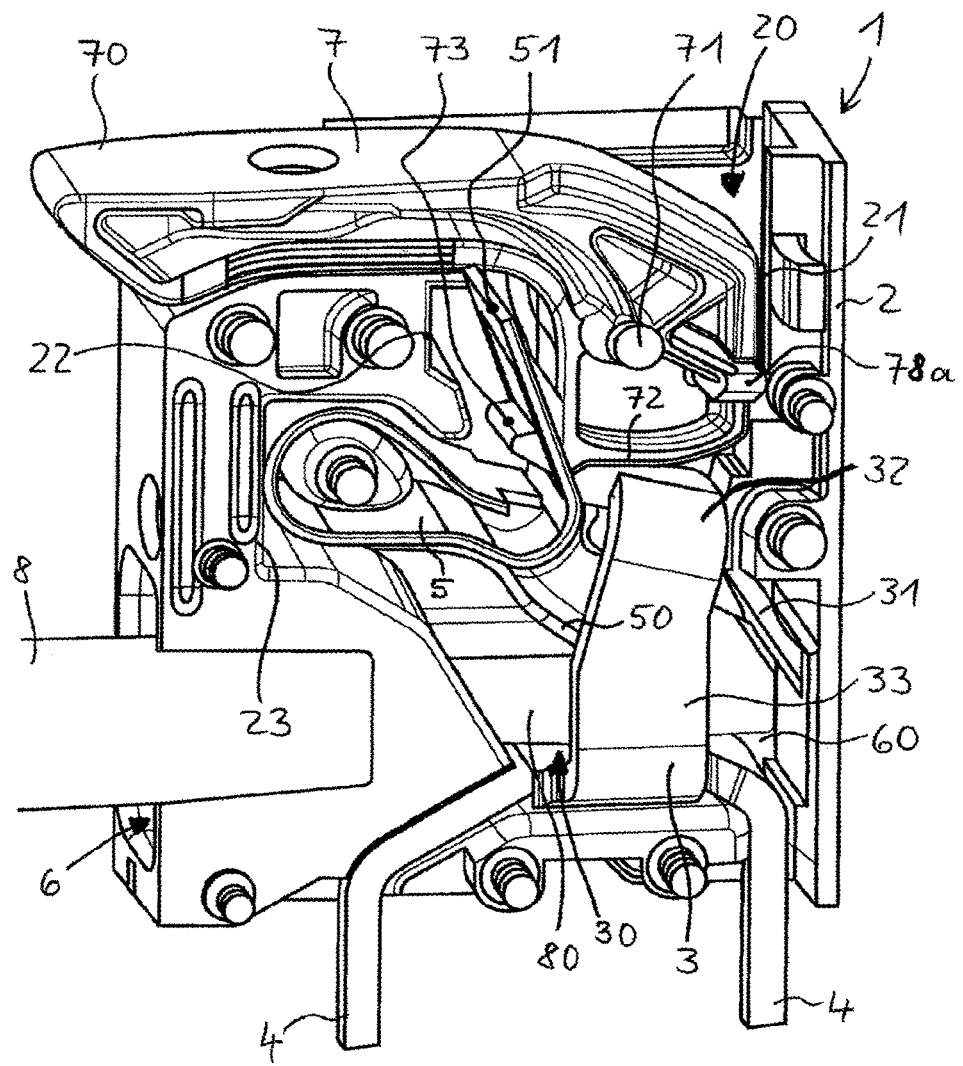
Figure 17:
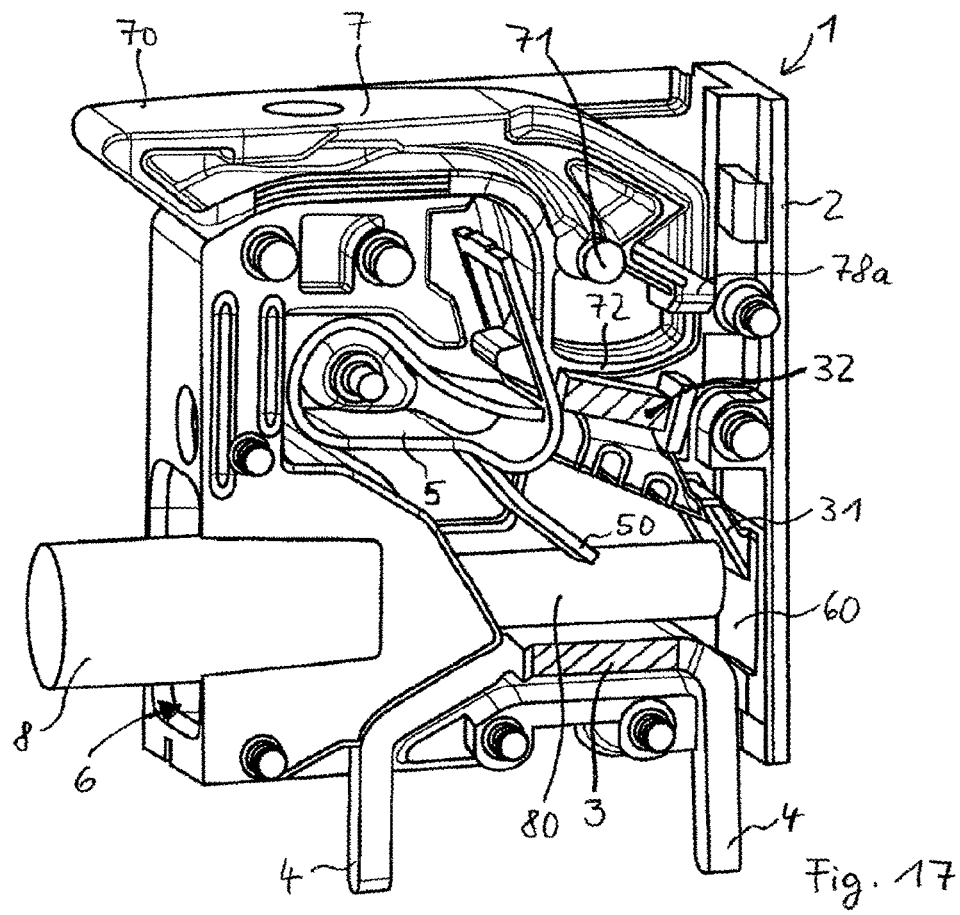
Figure 18:
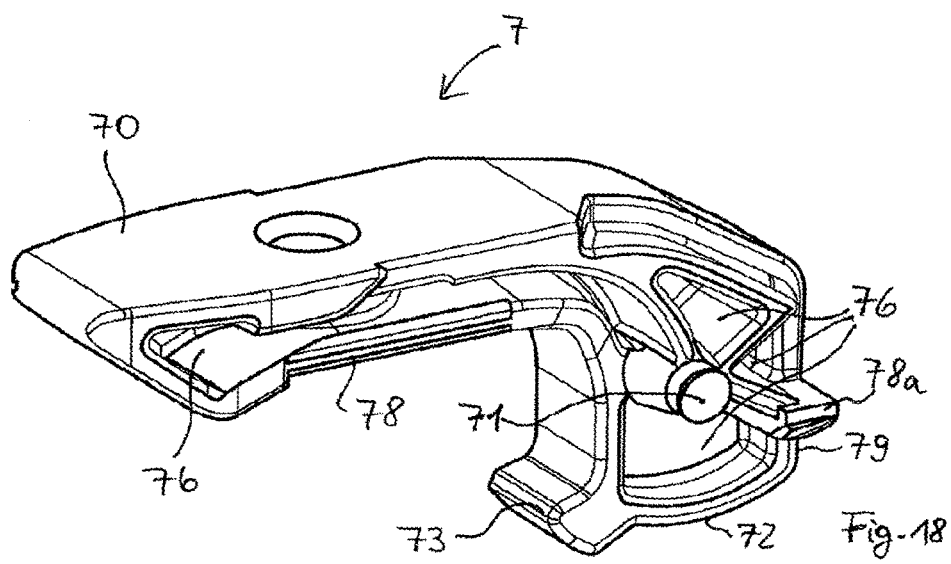

FIGS. 15 to 17 show a third embodiment of the conductor terminal, in each case in perspective. FIG. 18 shows the actuating lever 7 of this conductor terminal, likewise in perspective. In each of FIGS. 15 to 17, the actuating lever 7 is in the closed position. In FIGS. 16 and 17, an electrical conductor has additionally been inserted into the conductor terminal. The illustration in FIG. 17 corresponds to that in FIG. 16, with the difference that the contact piece 3 is shown in section at two points, namely such that the connecting section 33 is missing. This makes clearer the view of the insulating end 80 of the conductor 8 and the clamping thereof by means of the second end region 50 of the clamping spring 5.

One difference in the third embodiment of the conductor terminal from the above-described embodiments consists in the location and shaping of an element 78a, arranged on the lever 7, for fixing the lever in the closed position. The element 78a can once again be regarded as a latch but differs from the above-explained latch 74 fixed on the lever in that the lever fixing achieved in this way does not lead to a brief increase in actuating force when the lever 7 is opened. The element 78a can be in the form, for example, of a web which is arranged laterally on the lever 7 and runs in a recess in the adjoining housing 2 and in this way in each case defines/limits an end position of the actuating lever 7. As in the previous illustrative embodiments, the actuating lever 7 is fixed relative to the insulating-material housing 2 by means of lateral latch 78 arranged in the front region of the actuating lever 7.

The conductor terminal according to the invention in all the embodiments explained additionally has an optimized overload safeguard for protecting the clamping spring 5 when a conductor 8 is inserted into the conductor terminal 60 at too steep an angle or incorrectly in some other respect. For such cases, the clamping spring 5 must be protected from excessive loading of the second end region 50 and of the region which extends from the second end region 50 as far as the approximately semicircular spring arc extending along the wall 23. This is achieved by virtue of the fact that the second end region 50 of the clamping spring 5 extends as far as the beveled section 31 of the insulating-material housing, which acts as a conductor insertion bevel. In the illustrative embodiment, the beveled section 31, which is embodied as part of the insulating-material housing 2, extends to below the upper section 32 of the contact piece. This beveled section 31 thus simultaneously acts as a stop for the second end region 50 of the clamping spring 5, preventing the spring from being deflected further upward.

That part of the contact piece 3 on which the actuating lever 7 is supported, at least in the open position and possibly also further positions, in particular in positions before the open position is reached, can be designed as a ramp which rises during opening in the direction of rotation of the actuating lever, as a falling ramp or as a neutral surface without a slope. The above-described first and third embodiments of the terminal show a design as a rising ramp, while the second embodiment shows it as a neutral surface. It is likewise possible for a falling ramp to be implemented if the upper section 32 of the contact piece 3 is not designed to rise toward the actuating lever 7 in the direction of the front side of the terminal 1, i.e. the side of the conductor insertion opening 6, as can be seen in FIG. 1 for example, but is designed with a falling slope. By means of such an embodiment, the required actuating forces to be applied to the actuating lever 7 for pivoting into the open position can be reduced. Easier and more pleasant operation of the terminal is obtained.

What is claimed is:

1. A conductor connection terminal comprising:
   at least one insulating material housing;
   at least one contact insert that is arranged at least partially in the insulating material housing and has at least one contact piece and at least one clamping spring, the contact piece together with the clamping spring forms at least one conductor clamping point for an electrical conductor that is to be contacted via the conductor connection terminal, the electrical conductor being adapted to be acted on at the conductor clamping point by a spring force of the clamping spring; and
   at least one operating lever that is pivotably mounted in the insulating material housing for operating the clamping spring,
   wherein the operating lever is adapted to be pivoted from a closed position to an open position and vice versa relative to the insulating material housing and/or the contact piece,
   wherein an electrical conductor that is inserted into the conductor connection terminal is not acted on by the spring force of the clamping spring at the conductor clamping point at least in the open position,
   wherein the operating lever is mounted in a floating manner and is supported at least partially on the contact piece at least in the open position, and
   wherein, in the completely open position of the operating lever, the clamping spring on account of its tensile force, which is exerted onto a driver element of the clamping spring, holds the operating lever in the completely open position.

2. The conductor connection terminal according to claim 1, wherein the contact piece has a clamping section, in which the contact point is arranged, and a bearing section, on which the operating lever is at least partially supported in the open position, wherein a conductor receiving chamber is arranged between the clamping section and the bearing section.

3. The conductor connection terminal according to claim 2, wherein the operating lever is supported at least partially on a second side of the bearing section of the contact piece at least in the open position, the second side facing away from the conductor receiving chamber.

4. The conductor connection terminal according to claim 2, wherein the bearing section is connected to the clamping section via a connecting section of the contact piece.

5. The conductor connection terminal according to claim 2, wherein the bearing section of the contact piece is designed as a plate or a metal plate.

6. The conductor connection terminal according to claim 2, wherein a closed force chain is formed, at least in the open position of the operating lever, from a driver element of the clamping spring to a bearing limb of the clamping spring via a tension arm, which acts on the driver element of the operating lever via an outer contour thereof, and via the first side and the second side of the bearing section.

7. The conductor connection terminal according to claim 1, wherein the clamping spring has a bearing limb via which the clamping spring is supported on the contact piece on a first side of the bearing section, the first side facing the conductor receiving chamber.

8. The conductor connection terminal according to claim 1, wherein the conductor receiving chamber is separated from the operating lever by an upper section or the bearing section of the contact piece.

9. The conductor connection terminal according to claim 1, wherein a tension arm of the operating lever is arranged between an outer contour of the operating lever and a grip region of the operating lever.

10. The conductor connection terminal according to claim 1, wherein the conductor connection terminal has a first latching via the operating lever is latched in the open position.

11. The conductor connection terminal according to claim 1, wherein the first latching has a first lever latch, which is part of the operating lever, and a first contact piece latch, which is part of the contact piece, which first lever latch and first contact piece latch interact with one another in order to latch the operating lever in the open position.

12. The conductor connection terminal according to claim 1, wherein the operating lever has bearing pins that project parallel to the axis of rotation of the pivoting movement and secure the operating lever against removal of the operating lever from the insulating material housing.

13. The conductor connection terminal according to claim 1, wherein the insulating material housing has a lever insertion channel for the insertion of the operating lever, wherein the lever insertion channel has a guide contour for guiding the bearing pins at least during the insertion of the operating lever.

14. The conductor connection terminal according to claim 1, wherein the part of the contact piece on which the operating lever is supported at least in the open position is a ramp that falls in a direction of rotation of the operating lever during opening.

15. The conductor connection terminal according to claim 1, wherein the operating lever is supported on an upper section of the contact piece, and a conductor receiving chamber for receiving the electrical conductor to be contacted is arranged between the upper section and a contact point of the contact piece, at which contact point the conductor clamping point is formed together with an end region of the clamping spring.

16. The conductor connection terminal according to claim 1, wherein the operating lever has a first lever latch via which the operating lever is adapted to be fixed in a fully open position by the latching of the first lever latch to a part of the contact piece, which serves as a mating bearing, in the form of a latching.

17. The conductor connection terminal according to claim 16, wherein an additional latching is formed between a lower region of a tension arm of the operating lever and a projection, which is arranged on an inner housing wall of the insulating material housing in the completely open position of the operating lever.

18. The conductor connection terminal according to claim 17, wherein an active line of the tensile force of the driver element runs through between the latching and the additional latching.

* * * * *